(12) United States Patent
Stoltze (10) Patent No.: US 7,987,960 B2
(45) Date of Patent: Aug. 2, 2011

(54) TORQUE ARM ASSEMBLY FOR A BACKSTOPPING CLUTCH

(75) Inventor: David Pearson Stoltze, Brighton, MI (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 12/598,536

(22) PCT Filed: May 2, 2008

(86) PCT No.: PCT/US2008/062444
§ 371 (c)(1),
(2), (4) Date: Nov. 2, 2009

(87) PCT Pub. No.: WO2008/137698
PCT Pub. Date: Nov. 13, 2008

(65) Prior Publication Data
US 2010/0072022 A1     Mar. 25, 2010

(51) Int. Cl.
*F16H 57/10* (2006.01)
(52) U.S. Cl. .................................. 192/223.2; 192/30 W
(58) Field of Classification Search ............... 192/223.2, 192/223; 188/302, 82.1, 82.84, 84
See application file for complete search history.

(56) References Cited

U.S. PATENT DOCUMENTS

| | | | |
|---|---|---|---|
| 3,236,337 A * | 2/1966 | Marland et al. ............ | 188/82.84 |
| 3,745,858 A | 7/1973 | Biach | |
| 3,828,900 A * | 8/1974 | Anderson ................... | 192/12 A |
| 4,039,058 A | 8/1977 | Trzebiatowski | |
| 4,314,631 A | 2/1982 | Hagerman et al. | |
| 5,215,174 A | 6/1993 | Heidenreich | |
| 5,324,065 A * | 6/1994 | Derrien et al. ......... | 280/124.129 |
| 7,410,445 B2 * | 8/2008 | Surewaard et al. ............. | 477/22 |
| 2006/0185960 A1 * | 8/2006 | Pederson et al. .............. | 192/223 |

FOREIGN PATENT DOCUMENTS

WO    WO 2005/032985    4/2005

OTHER PUBLICATIONS

International Search Report issued in priority International (PCT) Application No. PCT/US2008/62444 (Aug. 20, 2008).
Written Opinion issued in priority International (PCT) Application No. PCT/US2008/62444 (Aug. 20, 2008).
"Marland Backstops," Marland Clutch (2005) pp. 1-12.

(Continued)

*Primary Examiner* — David D Le
*Assistant Examiner* — Ryan Dodd
(74) *Attorney, Agent, or Firm* — Dykema Gossett PLLC (57) ABSTRACT

Various torque arm assemblies for a backstopping clutch are provided that enable load sharing among multiple torque arm assemblies, controlled release of load on the torque arm assembly and/or load sensing. The torque arm assembly includes a head member that is connected to an outer race of a backstopping clutch and defines a pair of attachment points. One end of an arm member is pivotally connected to one attachment point of the head member while the other end of the arm member is connected to a stationary structure. A strut extends between the other attachment point of the head member and the arm member. Upon backstopping action in one embodiment, the head member rotates slightly against the force of the strut allowing other torque arm assemblies to receive a portion of the system load. The position of the strut may be adjustable to allow controlled release of the load tension.

28 Claims, 5 Drawing Sheets

OTHER PUBLICATIONS

"Installation Instructions—Type BC-Series "MA" Backstops," Marland Clutch (2005) pp. 1-8.

Timtner, Dr. Ing. Karlheinz, "Load Sharing Methods of Backstops in Conveyor Drive Systems," Society of Manufacturing Engineers (1998) pp. 1-10.

Office Action issued in priority U.S. Appl. No. 11/743,894 (Aug. 31, 2009).

Reply to Office Action filed in U.S. Appl. No. 11/743,894 (filed Mar. 1, 2010).

Office Action issued in U.S. Appl. No. 11/743,894 (May 26, 2010).

Reply to Office Action filed in U.S. Appl. No. 11/743,894 (Oct. 7, 2010).

Interview Summary issued in U.S. Appl. No. 11/743,894 (Oct. 12, 2010).

Response to Interview Summary filed in U.S. Appl. No. 11/743,894 (Oct. 20, 2010).

* cited by examiner

TORQUE ARM ASSEMBLY FOR A BACKSTOPPING CLUTCH

This application is the national stage application of, and claims priority to, International Application No. PCT/US2008/062444 filed May 2, 2008, the entire disclosure of which is incorporated herein by reference. The International Application was published in the English language on Nov. 13, 2008 as International Publication No. WO 2008/137698 and itself claims the benefit of U.S. patent application Ser. No. 11/743,894 filed May 3, 2007, the entire disclosure of which is incorporated herein by reference.

BACKGROUND OF THE INVENTION

1. Field of the Invention

This invention relates to torque arm assemblies for backstopping clutches and, more particularly, to torque arm assemblies that can facilitate load sharing among multiple backstop assemblies within a larger system and/or allow for controlled release of load or tension on the backstop.

2. Disclosure of Related Art

In many motor driven systems, it is desirable to prevent or limit movement of system components in one direction. For example, and with reference to FIG. 1, mining operations typically use inclined conveyors 10 to convey material 12 to a surface location or other outlet. It is desirable to prevent or limit reverse movement of the conveyor 10 in the event of a loss of power or a failure of a driveline component such as the motor 14 or motors, gearboxes or couplings in order to prevent material 12 from moving backwards on the conveyor 10 and causing damage to the system and significant injuries to personnel operating the system.

Figure 1:
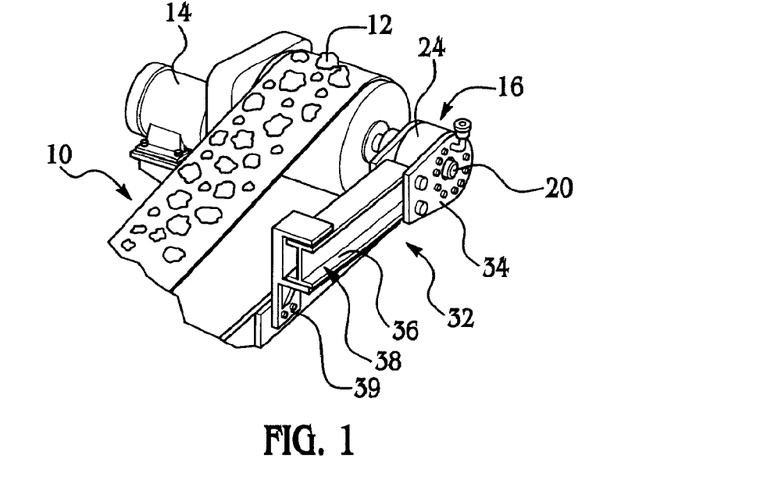
FIG. 1 is a perspective view of a conveyor system incorporating a prior art torque arm assembly.
Figure 2:
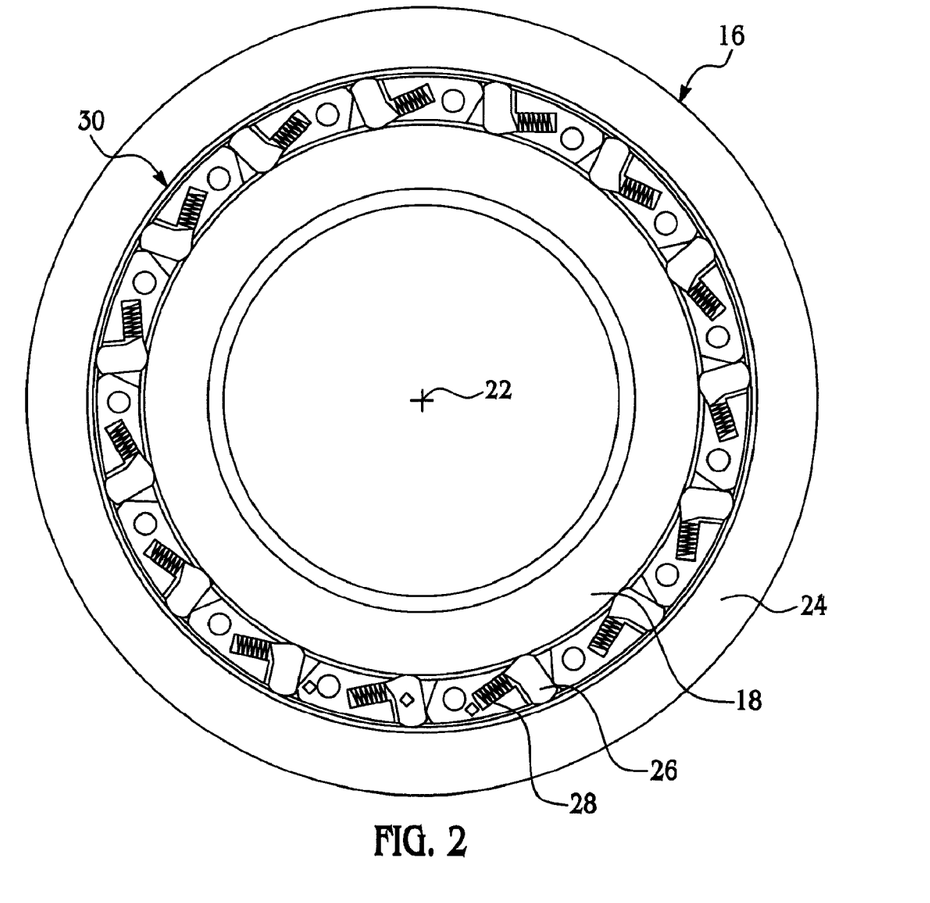
FIG. 2 is a cross-sectional view of a conventional backstopping clutch.

Backstopping clutches 16 are typically used to prevent reverse rotation of rotating system components. Referring to FIGS. 1 and 2, each clutch 16 includes an inner race 18 that is mounted to a shaft 20 driven by one or more motors 14 for rotation with the shaft 20 about a rotational axis 22. An outer race 24 is disposed radially outward of the inner race 18 and is generally fixed against rotation. A plurality of rollers 26 are disposed radially between the inner and outer races 18, 24 and are urged into engagement with the races 18, 24 by springs 28. The rollers 26 and/or a groove 30 in outer race 24 are shaped such that when the motor 14 drives the shaft 20 and inner race 18 in one rotational direction, the rollers 26 assume a first position permitting relative rotation of the inner and outer races 18, 24. When the driven shaft 20 and inner race 18 are driven in the opposite rotational direction (e.g. by the force of the load of material 12 upon failure of motor 14), the rollers 26 assume a second position and forcefully engage the inner and outer races 18, 24 and prevent the inner race 18 and driven shaft 20 from rotating relative to the fixed outer race 24.

Referring again to FIG. 1, the outer race 24 of each backstopping clutch 16 may be fixed against rotation using a torque arm assembly 32. The assembly 32 includes a head 34 that is connected to the outer race 24 of the clutch. An arm 36 extends from the head and is fixed at a remote end 38 to a stationary structure 39 (e.g., support structure for the conveyor 10). Arm 36 is integral with head 34 or rigidly coupled to head 34.

Conventional torque arm assemblies such as assembly 32 have several disadvantages. The rigid nature of the torque arm assembly 32 results in instantaneous engagement of the outer and inner races 18, 24 of clutch 16 and therefore requires that clutch 16 be designed to absorb the maximum load on the conveyor 10. Accordingly, the clutches 16 are relatively expensive. This is particularly problematic in systems incorporating multiple motors 14 and clutches 16. In large conveyor systems or in other applications, multiple backstopping clutches 16 may be disposed on a single shaft 20 and/or clutches may be required for multiple motor driven shafts 20. There is also no mechanism for indicating the load on clutch 16 and no mechanism for releasing load or tension on clutch 16. Some torque arm assemblies have been devised to enable load sharing among multiple clutches in large systems. Referring to FIG. 1, these type of assemblies have typically employed a rubber pad, spring, or hydraulic cylinder seated between end 36 of the arm and the stationary structure 39. Although these assemblies enable some form of load sharing by delaying engagement of the inner and outer races 18, 24 of the clutch 16, the assemblies require costly modifications to the support structure 39. Further, the assemblies do not provide means for lead sensing or releasing load or tension on the clutch 16.

The inventor herein has recognized a need for a torque arm assembly for a backstopping clutch that will minimize and/or eliminate one or more of the above-identified deficiencies.

SUMMARY OF THE INVENTION

The present invention provides an improved torque arm assembly for a backstopping clutch.

A torque arm assembly in accordance with one embodiment of the present invention includes a head member configured for connection to an outer race of the backstopping clutch, the head member defining first and second spaced attachment points. The assembly further includes an arm member configured for connection to a stationary structure proximate a first end of the arm member and pivotally connected to the first attachment point of the head member proximate a second end of the arm member. The assembly further includes a strut coupled at a first end to the second attachment point of the head member and at a second end to the arm member. In accordance with another embodiment of the invention, the assembly may include a sensor or a graduated load indicator scale disposed between the head member and arm member and configured to indicate the distance between the head member and arm member and, therefore, the load on the clutch and torque arm assembly. In accordance with another embodiment of the invention, a strut seat on the arm member is adjustable along an axis of the strut to enable a controlled release of the load or tension on the clutch and torque arm assembly. In yet another embodiment of the invention, a damper is connected at one end to the head member and at a second end to the arm member and is used with the strut to tune the assembly for controlled reaction of system forces.

A torque arm assembly in accordance with the present invention represents a significant improvement relative to conventional assemblies. An assembly in accordance with one embodiment of the invention enables a controlled, limited motion of the outer race of the clutch thereby delaying clutch engagement and enabling load sharing among clutches and torque arm assemblies in large systems. Further, the assembly enables load sharing without requiring expensive modifications to existing systems. Assemblies in accordance with some embodiments of the invention may also, or alternatively, provide an indication of load on each assembly and enables a controlled release of load or tension on the clutch and assembly. Assemblies in accordance with some embodiment of the invention may further enable tuning of the assembly to control reaction to forces in the system in which the assemblies are employed.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figures 3, 4:
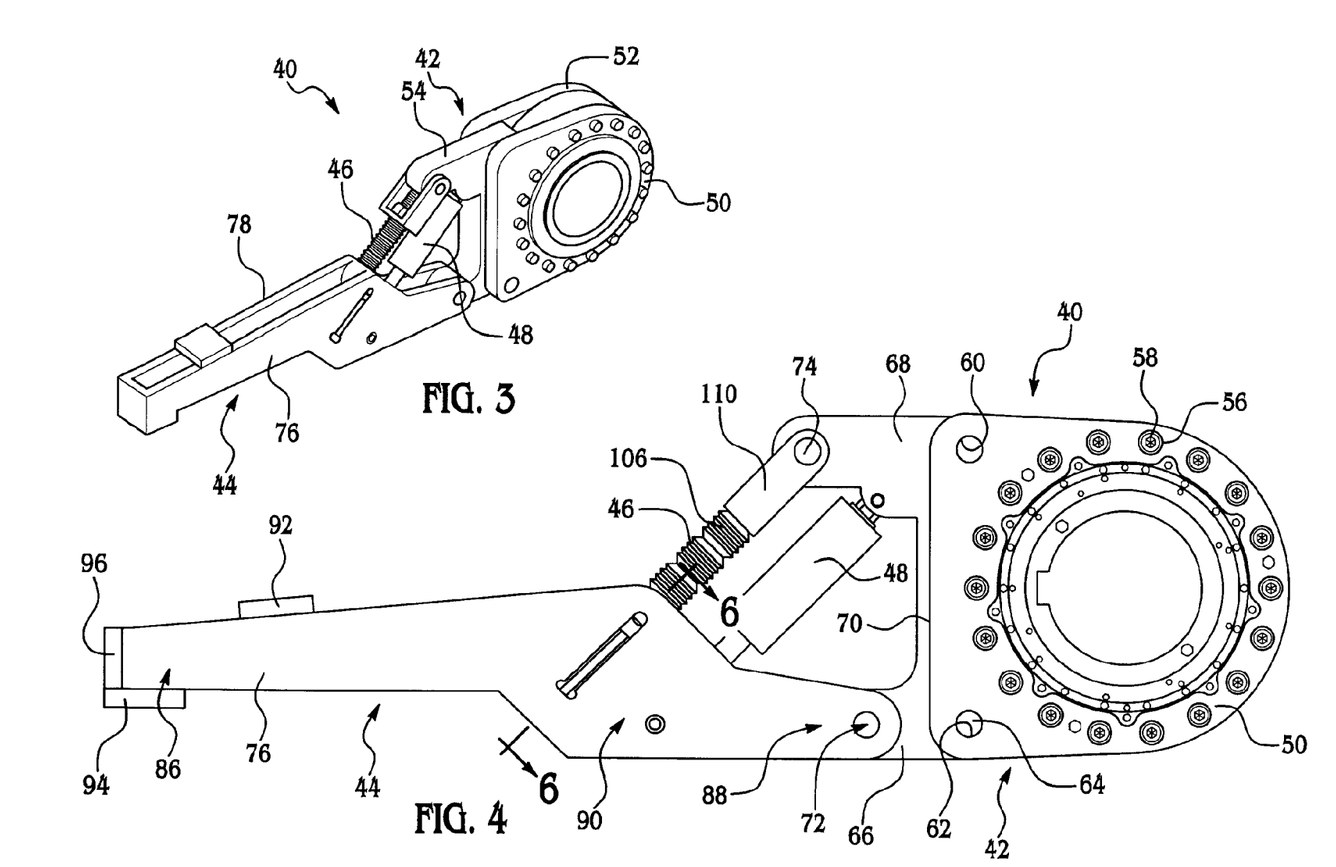
FIG. 3 is a perspective view of a torque arm assembly in accordance with one embodiment of the present invention.
FIG. 4 is a side plan view of the assembly of FIG. 3.

Referring now to the drawings wherein like reference numerals are used to identify identical components in the various views, FIG. 3 illustrates one embodiment of a torque arm assembly 40 in accordance with the present invention. Assembly 40 is provided to inhibit rotation of the outer race of a backstopping clutch, such as outer race 24 of clutch 16 (see FIG. 2), and to absorb the load imposed on clutch 16 when clutch 16 prevents reverse rotation of a motor drive shaft. Assembly 40 includes a head member 42, an arm member 44 and a strut 46. Assembly 46 may further include a damper 48.

Head member 42 is provided to couple the outer race 24 of clutch 16 and the remaining components of assembly 40. Member 42 includes first and second clutch attachment plates 50, 52 and an arm attachment plate 54. Although plates 50, 52, 54 are shown as separate elements in the illustrated drawing, it should be understood that plates 50, 52, 54 could be integrated to form a unitary structure.

Plates 50, 52 are coupled to opposite sides of outer race 24. Plates 50, 52 may include a plurality of aligned apertures 56 disposed in a circular pattern and configured to receive fasteners 58 extending through plates 50, 52 and outer race 24. Plates 50, 52 may be annular to provide clearance for driven shaft 20 and portions of clutch 16. Plates 50, 52 may be generally bell shaped and may define a space therebetween extending outwardly from clutch 16 and configured to receive plate 54 (as best shown in FIG. 3). Plates 50, 52 define pairs of aligned apertures 60, 62 configured to receive fasteners 64 extending through plates 50, 52 and plate 54.

Plate 54 is disposed between plates 50, 52 and is coupled to plates 50, 52 through fasteners 64. Referring to FIG. 4, plate 54 is generally U-shaped and defines a pair of spaced arms 66, 68 extending from a base 70. Arm 66 is shorter than arm 68. It should be understood that the shape and dimensions of plate 54 may vary depending on various design requirements associated with assembly 40. Arms 66, 68 define a pair of spaced attachment points 72, 74 for arm member 44 and strut 46 as discussed in greater detail hereinbelow. Arm 68 may further define an attachment point for damper 48.

Figure 5:
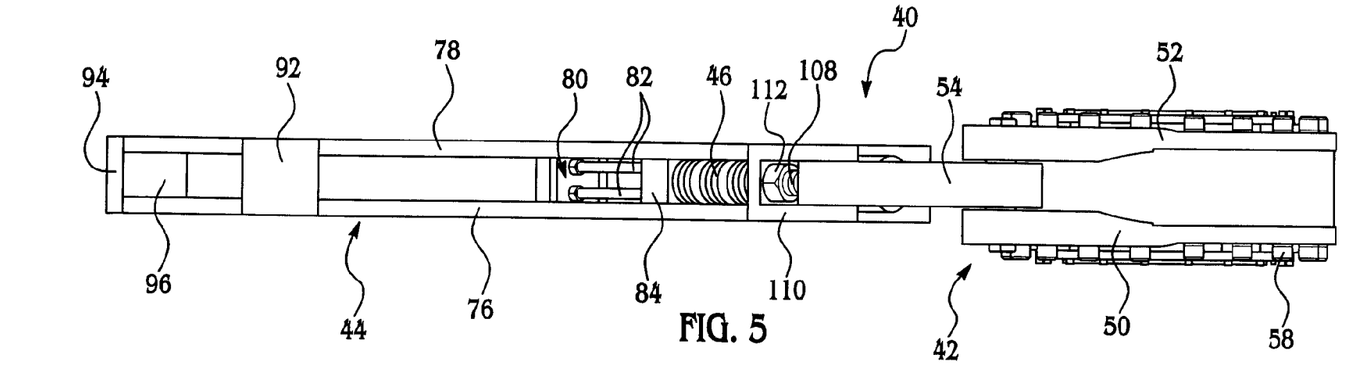
FIG. 5 is a top plan view of the assembly of FIG. 3.

Arm member 44 transmits the load on clutch 16 and assembly 40 to a stationary structure, such as structure 39 shown in FIG. 1. Arm member 44 may include a pair of spaced plates 76, 78. Referring to FIG. 5, arm member 44 also includes means, such as nut assembly 80, fasteners 82 and a strut seat 84 for releasing load or tension on clutch 16 and assembly 40.

Referring again to FIGS. 3-5, Plates 76, 78 transmit load from clutch 16 to structure 39. Plates 76, 78 are spaced from one another. Referring to FIG. 4, plates 76, 78 define first and second end portions 86, 88 and a transition portion 90 of arm member 44 and may be joined together by top, bottom and end plates 92, 94, 96, respectively. End portion 86 is connected to structure 39 in a manner that inhibits movement of end portion 86 relative to structure 39. End portion 88 is pivotally connected to plate 54 of head member 42 at attachment point 72 through a bushing or bearing (not shown). Transition portion 90 is disposed between end portions 86, 88 and descends at an oblique angle from end portion 86 to end portion 88. Referring to FIG. 5, plate 80, fasteners 82 and strut seat 84 are disposed between plates 76, 78 within transition portion 90 of arm member 44. Referring to FIG. 4, transition portion 90 may also provide an attachment point for damper 48.

Figure 6:
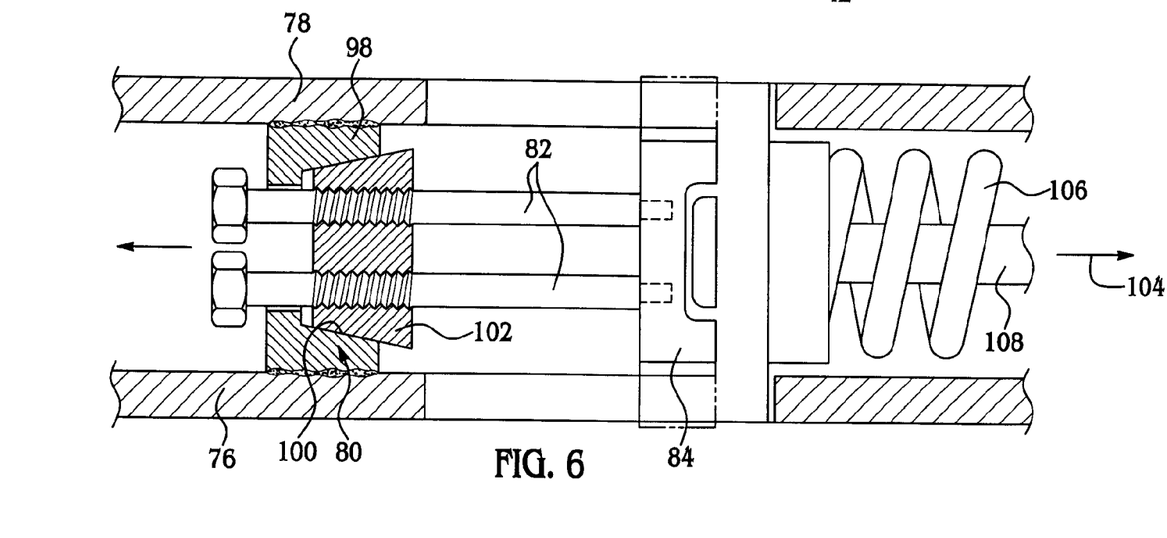
FIG. 6 is a cross-sectional view of a portion of the assembly of FIG. 3 taken along lines 6-6 of FIG. 4.

Nut assembly 80, fasteners 82 and strut seat 84 provide a means for releasing load or tension on clutch 16 and arm assembly 40. Referring now to FIG. 6, assembly 80 includes a first member 98 that is affixed to plates 76, 78 through, for example, welds or other fasteners. Member 98 defines a stepped diameter bore 100 configured to receive fasteners 82 and a nut 102. A portion of bore 100 may be tapered and correspond to a tapered surface of nut 102. Fasteners 82 are threaded and extend through nut 102 and into strut seat 84. Strut seat 84 defines a seat for strut 46. The configuration of strut seat 84 may vary depending on the type of strut 46 that is used in assembly 40. Strut seat 84 is movable relative to plates 76, 78 and nut assembly 80 along an axis 104 of strut 46. In particular, fasteners 82 may be rotated to adjust the position of strut seat 84 and, therefore, the reaction force of strut 46. In this manner, load or tension on clutch 16 and assembly 40 may be released following a backstopping action by allowing some limited, controlled, additional reverse rotation of outer race 24 of clutch 16 and, therefore, inner race 18 and shaft 20. In one embodiment, adjustment of strut seat 84 may permit rotation of about seventeen degrees. It should be understood that, although the illustrated embodiment includes nut assembly 80 and fasteners 82, other structures could be employed to enable control movement of strut seat 84 along axis 104.

Referring again to FIGS. 3-5, strut 46 is provided to permit movement of head member 42 relative to arm member 44 to thereby enable load sharing among multiple assemblies 40 in a larger system such as conveyor 10. Strut 46 may comprise a compression spring 106, but it should be understood that a fluid cylinder may also be employed. Referring to FIG. 4, spring 106 is coupled at a first end to plate 54 of head member 42 at attachment point 74. Referring to FIGS. 4-6, spring 106 may be disposed about a threaded shaft 108 extending between a clevis 110 and strut seat 84. Referring to FIG. 5, shaft 108 may extend through an aperture in clevis 110 and be fixed thereto by a nut 112 disposed on one side of clevis 110. The opposite side of clevis 110 may form a seat for spring 106 opposing strut seat 84. Referring to FIG. 4, clevis 110 is pivotally connected to arm 88 of plate 54 at attachment point 74 through a bushing or bearing (not shown). When the direction of rotation of shaft 20 and inner race 18 of clutch 16 is reversed due, for example, to the load on the system following a failure of motor 14, the rollers 26 will couple inner and outer races 18, 24 of clutch 16 in accordance with the normal operation of the clutch. The non-rigid attachment of assembly 40 through the use of strut 46, however, will allow a limited reverse rotation of outer race 24 (and therefore inner race 18 and shaft 20). The rotation may be less than two degrees in one embodiment of the invention. The degree of rotation, however, can be adjusted based on the selection of the strut 46. The limited rotation provides additional time for other clutches 16 in the system to engage and therefore enables load sharing among assemblies 40 in a larger system. As a result, the clutch 16 does not have to be designed to absorb the maximum loading on the system and less expensive clutches can be employed. The inventive system also enables controlled load sharing because the amount of rotation can be adjusted through selection of strut 46. Further, the inventive assembly 40 accomplishes load sharing without requiring modifications to the support structure 39 and therefore can be adapted to existing systems.

Referring to FIGS. 3-4, damper 48 is provided to control motion of assembly 40 as loads are applied and released. Damper 48 may comprise a fluid damper and, particularly, a hydraulic damper. Damper 48 is connected at one end to plate 54 of head member 42 and at an opposite end to arm member 44. Damper 48 may extend substantially parallel to damper 46 between arm 68 of plate 54 and transition portion 90 of arm member 44. Damper 48 may also be arranged coaxially with strut 46. The relative motion of assembly 40 in reaction to changes in load can be controlled through selection of damper 48.

Figure 7:
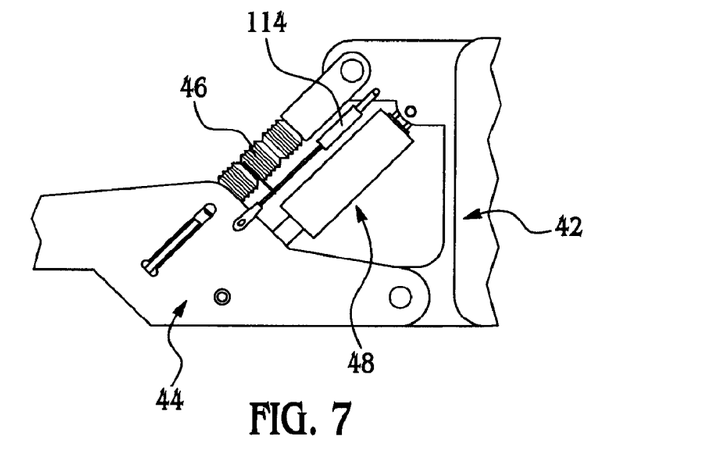
FIG. 7 is a side plan view of a portion of a torque arm assembly in accordance with another embodiment of the present invention.
Figure 8:
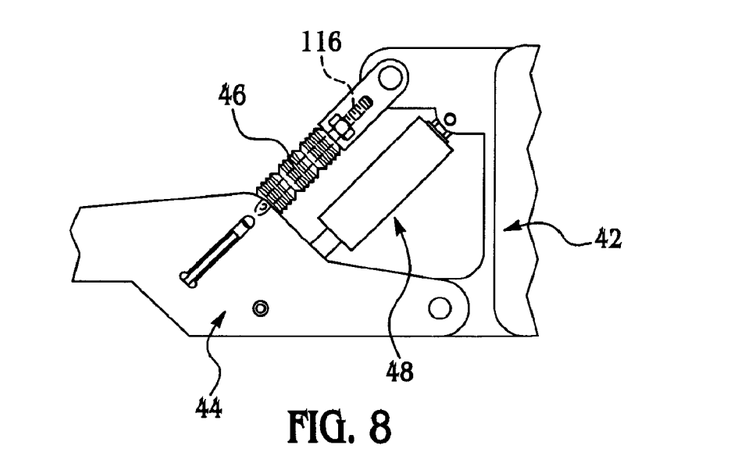
FIG. 8 is a side plan view of a portion of a torque arm assembly in accordance with another embodiment of the present invention.
Figure 9:
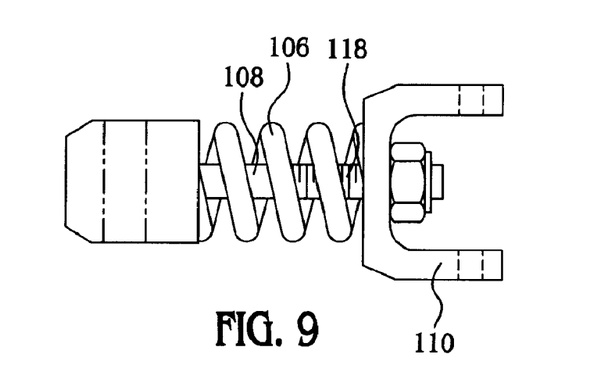
FIG. 9 is a side plan view of a portion of a torque arm assembly in accordance with another embodiment of the present invention.

Referring now to FIG. 7-9, assembly 40 may further include means, such as a sensor 114 (FIG. 7) or a graduated load indicator scale 116 (FIG. 8) or 118 (FIG. 9), for measuring the distance between head member 42 and arm member 44 to provide an indication of the load on clutch 16 and assembly 40. Referring to FIG. 7, sensor 114 may comprise a linear voltage displacement transducer connected between attachment point 74 or another point on arm 68 of plate 54 of head member 42 and transition portion 90 of arm member 44. Sensor 114 may display the relative distance or indication of load or may transmit a signal to a remote processor or display. Referring to FIG. 8, a graduated load indicator scale 116 may alternatively be connected between attachment point 74 or another point on arm 68 of plate 54 of head member 42 and transition portion 90 of arm member 44 to provide a visual indication of the relative distance or indication of load. Scale 116 may be arranged in parallel with strut 46. Referring to FIG. 9, a graduated load indicator scale 118 may alternatively be formed on shaft 108 arranged coaxially with spring 106 to reduce the number of components.

Figures 10, 11:
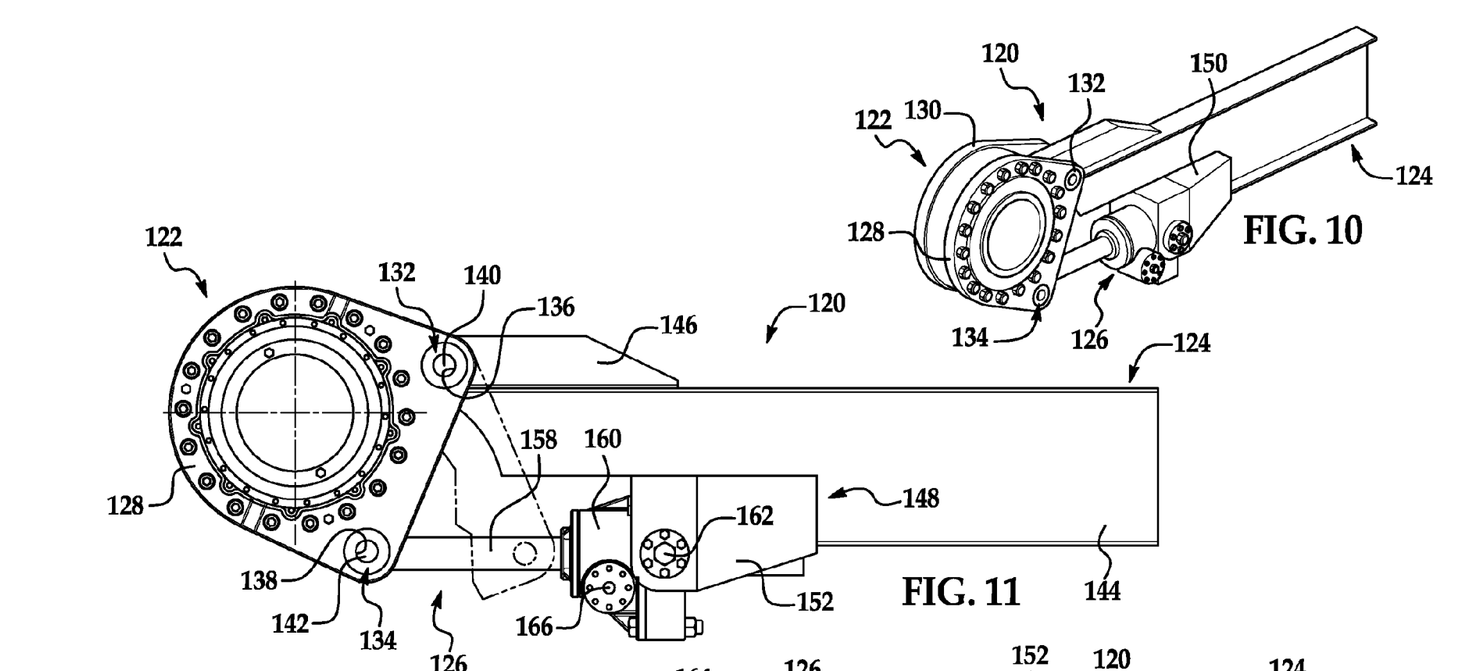
FIG. 10 is a perspective view of a torque arm assembly in accordance with another embodiment of the present invention.
FIG. 11 is a side plan view of the assembly of FIG. 10.
Figure 12:
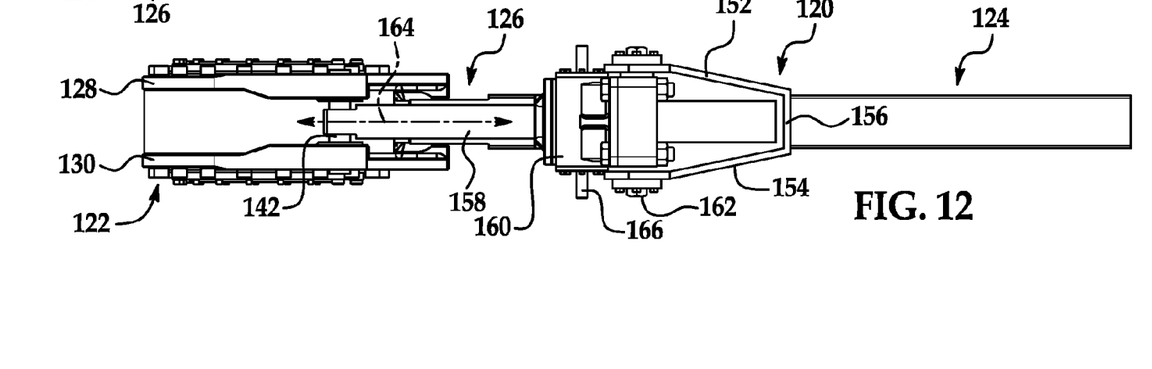
FIG. 12 is a top plan view of the assembly of FIG. 10.

Referring now to FIGS. 10-12, a torque arm assembly 120 in accordance with another embodiment of the invention is shown. Assembly 120 is again provided to inhibit rotation of the outer race of a backstopping clutch, such as outer race 24 of clutch 16 (see FIG. 2), and to absorb the load imposed on clutch 16 when clutch 16 prevents reverse rotation of a motor drive shaft. Assembly 120 includes a head member 122, an arm member 124 and a strut 126.

Head member 122 is provided to couple the outer race 24 of clutch 16 and the remaining components of assembly 120. Member 122 includes first and second clutch attachment plates 128, 130. Plates 128, 130 are coupled to opposite sides of outer race 24. Plates 128, 130 may include a plurality of aligned apertures 132 disposed in a circular pattern and configured to receive fasteners 134 extending through plates 128, 130 and outer race 24. Plates 128, 130 may be annular to provide clearance for driven shaft 20 and portions of clutch 16. Plates 128, 130 may be generally bell shaped and may define a space therebetween extending outwardly from clutch 16 and configured to receive a portion of arm member 124. Plates 128, 130 define a pair of spaced attachment points 132, 134 for arm member 124 and strut 126 as discussed in greater detail hereinbelow. Plates 128, 130 further define pairs of aligned apertures 136, 138 at attachment points 132, 134 configured to receive fasteners 140, 142 extending through plates 128, 130 and arm member 124 and through plates 128, 130 and strut 126, respectively.

Arm member 124 transmits the load on clutch 16 and assembly 120 to a stationary structure, such as structure 39 shown in FIG. 1. Arm member 124 may include a beam 144 that is generally I-shaped in cross-section and is connected to structure 39 in a manner that inhibits movement of beam 144 relative to structure 39. An arm extension 146 may extend from one side of beam 144 and is pivotally connected to plates 128, 130 of head member 122 at attachment point 132 through a bushing or bearing (not shown). A bracket 148 may be coupled to an opposite side of bream 144 for a purpose described hereinbelow. Bracket 148 may include a top wall 150 (best shown in FIG. 10) and side walls 152, 154, 156 extending from top wall 150. Bracket 148 may be welded to beam 144.

Strut 126 is provided to permit rotation of head member 122 to release the load or tension on clutch 16 and assembly 120 following a backstopping action by allowing some limited, controlled, reverse rotation of outer race 24 of clutch 16 and, therefore, inner race 18 and shaft 20. In one embodiment, strut 126 may permit rotation of about forty-five degrees. Strut 126 is coupled at one end to attachment point 134 of head member 122 and at another end to arm member 124. Strut 126 may comprise a shaft 158. One end of shaft 158 may define an aperture configured to receive fastener 142 and a bushing or bearing (not shown) through which shaft 158 is pivotally connected to plates 128, 130 of head member 122 at attachment point 134. The other end of shaft 158 may be disposed within a housing 160. Housing 160 is received within bracket 148 of arm member 124 and is pivotally supported within bracket 148. Side walls 152, 154 of bracket 148 and housing 160 may all define aligned apertures configure to receive a fastener 162 and a bushing or bearing (not shown) to permit housing 160 to rotate relative to bracket 148.

Shaft 158 extends outward from housing 160 and is movable along an axis 164 extending through shaft 158 to retract and extend shaft 158 relative to housing 160. Movement of shaft 158 along axis 164 causes rotation of head member 122. A portion of shaft 158 may be threaded, permitting shaft 158 to move in response to rotation of a worm gear (not shown) disposed within housing 160 and driven by an input shaft 166 that is perpendicular to shaft 158 and also extends from either side of housing 160. The input shaft 166 may be turned with a wrench or other tool. During normal operation of the clutch 16, shaft 158 is retracted and the threaded portion of shaft 158 is disposed within housing 160 to protect it from foreign objects and elements. Following a backstopping operation of clutch 16, shaft 158 may be extended from housing 160 to cause rotation of head member 122 and outer race 24 of clutch 16 and a limited release of the load or tension on clutch 16.

A torque arm assembly 40 or 120 in accordance with the present invention represents a significant improvement relative to conventional assemblies. The assembly 40 enables load sharing among multiple assemblies 40 by allowing a limited, controlled reverse rotation of the outer race 24 of backstopping clutch 16 to thereby provide time for other clutches 16 and assemblies 40 to absorb a portion of the load. Moreover, load sharing is accomplished without the need for expensive modifications to the system support structure (e.g., support structure 39 of conveyor 10). The inventive assemblies 40, 1220 further enable a controlled release of load or tension on the clutch and assemblies 40, 120 by permitting movement of one seat 84 of the strut 46 (in the case of assembly 40) or by permitting movement of shaft 158 (in the case of assembly 120). The assemblies 40, 120 further enables sensing of the load on the clutch 16 or assemblies 40, 120.

While the invention has been shown and described with reference to one or more particular embodiments thereof, it will be understood by those of skill in the art that various changes and modifications can be made without departing from the spirit and scope of the invention.

I claim:

1. A torque arm assembly for a backstopping clutch disposed about a driven shaft, comprising:
   a head member configured for connection to an outer race of said backstopping clutch, said backstopping clutch inhibiting rotation of said driven shaft in a first rotational direction, said head member defining first and second spaced attachment points;
   an arm member configured for connection to a stationary structure proximate a first end of the arm member and pivotally connected to said first attachment point of said head member proximate a second end of said arm member; and,
   a strut coupled at a first end to said second attachment point of said head member and at a second end to said arm member
   wherein said backstopping clutch applies a braking torque to said driven shaft to prevent rotation of said driven shaft in said first rotational direction.

2. The torque arm assembly of claim 1, further comprising a damper connected at one end to said head member and at a second end to said arm member.

3. The torque arm assembly of claim 2 wherein said damper is arranged substantially parallel to said strut.

4. The torque arm assembly of claim 1, further comprising a sensor configured to generate a signal indicative of a distance between said head member and said arm member.

5. The torque arm assembly of claim 4 wherein said sensor comprises a linear voltage displacement transducer.

6. The torque arm assembly of claim 1, further comprising a graduated load indicator scale disposed between said head member and said arm member.

7. The torque arm assembly of claim 6 wherein said strut comprises a spring and said scale is located on a shaft arranged coaxially with said spring.

8. The torque arm assembly of claim 6 wherein said scale is located in parallel to said strut.

9. The torque arm assembly of claim 1 wherein said arm member includes a strut seat against which said second end of said strut reacts, said strut seat adjustable along an axis of said strut.

10. The torque arm assembly of claim 1 wherein said second end of said strut is connected to said arm member intermediate said first and second ends of said arm member.

11. The torque arm assembly of claim 1 wherein said strut comprises a spring.

12. The torque arm assembly of claim 1 wherein said strut comprises a shaft.

13. The torque arm assembly of claim 12 wherein said shaft is movable along an axis of said shaft.

14. The torque arm assembly of claim 12 wherein said second end of said strut is disposed within a housing, said housing pivotally connected to said arm.

15. A backstopping clutch and torque arm assembly, comprising:
   a backstopping clutch comprising:
      an inner race configured for connection to a driven shaft;
      an outer race disposed radially outwardly of said inner race; and,
      a plurality of rollers disposed between said inner and outer races, said plurality of rollers configured to engage said outer race and inhibit rotation of said inner race and said driven shaft in a first rotational direction; and,
   a torque arm assembly, comprising:
      a head member configured for connection to said outer race of said backstopping clutch, said head member defining first and second spaced attachment points;
      an arm member configured for connection to a stationary structure proximate a first end of the arm member and pivotally connected to said first attachment point of said head member proximate a second end of said arm member; and,
      a strut coupled at a first end to said second attachment point of said head member and at a second end to said arm member
      wherein said backstopping clutch applies a braking torque to said driven shaft to prevent rotation of said driven shaft in said first rotational direction.

16. The backstopping clutch and torque arm assembly of claim 15, further comprising a damper connected at one end to said head member and at a second end to said arm member.

17. The backstopping clutch and torque arm assembly of claim 16 wherein said damper is arranged substantially parallel to said strut.

18. The backstopping clutch and torque arm assembly of claim 15, further comprising a sensor configured to generate a signal indicative of a distance between said head member and said arm member.

19. The backstopping clutch and torque arm assembly of claim 18 wherein said sensor comprises a linear voltage displacement transducer.

20. The backstopping clutch and torque arm assembly of claim 15, further comprising a graduated load indicator scale disposed between said head member and said arm member.

21. The backstopping clutch and torque arm assembly of claim 20 wherein said strut comprises a spring and said scale is located on a shaft arranged coaxially with said spring.

22. The backstopping clutch and torque arm assembly of claim 20 wherein said scale is located in parallel to said strut.

23. The backstopping clutch and torque arm assembly of claim 15 wherein said arm member includes a strut seat against which said second end of said strut reacts, said strut seat adjustable along an axis of said strut.

24. The backstopping clutch and torque arm assembly of claim 15 wherein said second end of said strut is connected to said arm member intermediate said first and second ends of said arm member.

25. The backstopping clutch and torque arm assembly of claim 15 wherein said strut comprises a spring.

26. The backstopping clutch and torque arm assembly of claim 15 wherein said strut comprises a shaft.

27. The backstopping clutch and torque arm assembly of claim 26 wherein said shaft is movable along an axis of said shaft.

28. The backstopping clutch and torque arm assembly of claim 26 wherein said second end of said strut is disposed within a housing, said housing pivotally connected to said arm.

* * * * *